(12) United States Patent
Yang et al.

(10) Patent No.: US 12,704,109 B2
(45) Date of Patent: Aug. 11, 2026

(54) LIGHTWEIGHT SPAR CAP WITH CONCAVE STRUCTURE FOR WIND TURBINE BLADE AND MANUFACTURING METHOD THEREOF, WIND TURBINE BLADE AND MANUFACTURING METHOD THEREOF

(71) Applicant: Zhuzhou Times New Material Technology Co., Ltd., Zhuzhou (CN)

(72) Inventors: Jun Yang, Zhuzhou (CN); Chaoyi Peng, Zhuzhou (CN); Xuebin Feng, Zhuzhou (CN); Binbin Hou, Zhuzhou (CN); Hang Deng, Zhuzhou (CN); Jiehua Hu, Zhuzhou (CN); Pengcheng Liang, Zhuzhou (CN); Jiangang Zhao, Zhuzhou (CN); Manchuang Zhang, Zhuzhou (CN)

(73) Assignee: Zhuzhou Times New Material Technology Co., Ltd., Zhuzhou (CN)

( * ) Notice: Subject to any disclaimer, the term of this patent is extended or adjusted under 35 U.S.C. 154(b) by 522 days.

(21) Appl. No.: 17/599,735

(22) PCT Filed: Jun. 17, 2021

(86) PCT No.: PCT/CN2021/100667
§ 371 (c)(1),
(2) Date: Sep. 29, 2021

(87) PCT Pub. No.: WO2022/007610
PCT Pub. Date: Jan. 13, 2022

(65) Prior Publication Data

US 2022/0186708 A1 Jun. 16, 2022

(30) Foreign Application Priority Data

Jul. 7, 2020 (CN) ........................ 202010643973.2
Jun. 2, 2021 (CN) ........................ 202110614148.4

(51) Int. Cl.
*F03D 1/06* (2006.01)
*F03D 80/30* (2016.01)
(Continued)

(52) U.S. Cl.
CPC .......... *F03D 1/0675* (2013.01); *F03D 80/30* (2016.05); *B29C 66/1142* (2013.01);
(Continued)

(58) Field of Classification Search
CPC ...... B64D 45/02; H02G 13/00; F03D 1/0675; F03D 1/06; F03D 80/30; B29C 66/1142;
(Continued)

(56) References Cited

U.S. PATENT DOCUMENTS 6,457,943 B1 * 10/2002 Olsen ...................... F03D 80/30 416/241 A
7,037,568 B1 5/2006 Rogers et al.
(Continued)

FOREIGN PATENT DOCUMENTS

CN 101704300 A 5/2010
CN 101825057 A 9/2010
(Continued)

OTHER PUBLICATIONS

International Search Report in the international application No. PCT/CN2021/100667, mailed on Sep. 6, 2021, 2 pages.
(Continued)

*Primary Examiner* — Nathaniel E Wiehe
*Assistant Examiner* — Joshua R Beebe
(74) *Attorney, Agent, or Firm* — Cooper Legal Group, LLC

(57) ABSTRACT

The present disclosure provides a lightweight spar cap with a concave structure for a wind turbine blade and a manufacturing method thereof, a wind turbine blade and a manufacturing method thereof. The lightweight spar cap is
(Continued)

groove-shaped as a whole, and includes supporting portions located on two wings of the lightweight spar cap and an intermediate connecting portion connecting the two supporting portions. The manufacturing method of the lightweight spar cap includes laying a reinforcing body of the intermediate connecting portion and a supporting material of the supporting portion, and performing resin infusion. By comprehensively considering multiple factors, the present disclosure reduces the weight of the wind turbine blade, improves the material utilization of the wind turbine blade, and realizes a lightweight wind turbine blade.

15 Claims, 7 Drawing Sheets

(51) Int. Cl.
*B29C 65/00* (2006.01)
*B29L 31/08* (2006.01)

(52) U.S. Cl.
CPC ..... *B29L 2031/085* (2013.01); *F05B 2230/60* (2013.01); *F05B 2280/2006* (2013.01); *F05B 2280/6003* (2013.01)

(58) Field of Classification Search
CPC ............ B29L 2031/085; F05B 2230/60; F05B 2280/2006; F05B 2280/6003
See application file for complete search history.

(56) References Cited

U.S. PATENT DOCUMENTS 7,258,828 B2 * 8/2007 Fish ........................ B29C 65/54 156/286
7,841,835 B2 * 11/2010 Bagepalli .............. F03D 1/0675 416/241 A
8,118,559 B2 * 2/2012 Llorente Gonzalez ...................... F03D 1/065 416/226
9,599,094 B2 * 3/2017 Dahl ........................ B29C 70/48
10,844,844 B2 * 11/2020 Lee ........................ F03D 1/0675
11,028,824 B2 * 6/2021 Garm .................... F03D 1/0675
11,486,352 B2 * 11/2022 Merzhaeuser ........ F03D 1/0675
11,555,482 B2 * 1/2023 Girolamo ................ F03D 80/30
11,598,309 B2 * 3/2023 Monie ................... F03D 1/0633
2009/0169392 A1 * 7/2009 Kuroiwa ............... F03D 1/0675 416/241 A
2010/0135815 A1 6/2010 Bagepalli et al.
2011/0008175 A1 1/2011 Gau
2012/0027612 A1 * 2/2012 Yarbrough ............ F03D 1/0675 416/226
2016/0258423 A1 * 9/2016 Whitehouse .......... F03D 1/0675
2018/0223795 A1 * 8/2018 Tobin ...................... B29C 64/10
2018/0238301 A1 8/2018 Tobin et al.
2019/0077096 A1 * 3/2019 Albert ..................... B29C 70/38
2019/0293048 A1 9/2019 Roberts et al.
2020/0080542 A1 3/2020 Monie et al.
2021/0246868 A1 8/2021 Smith et al.

FOREIGN PATENT DOCUMENTS

| | | | | |
|---|---|---|---|---|
| CN | 102029721 A | | 4/2011 | |
| CN | 102889169 A | | 1/2013 | |
| CN | 102889170 A | | 1/2013 | |
| CN | 103277245 A | | 9/2013 | |
| CN | 203383989 A | | 1/2014 | |
| CN | 106903917 A | | 6/2017 | |
| CN | 206889167 U | | 1/2018 | |
| CN | 108509663 A | | 9/2018 | |
| CN | 108626069 A | | 10/2018 | |
| CN | 108661853 A | | 10/2018 | |
| CN | 207960838 U | | 10/2018 | |
| CN | 110219784 A | | 9/2019 | |
| CN | 110500242 A | | 11/2019 | |
| CN | 209855954 U | | 12/2019 | |
| CN | 209959402 U | | 1/2020 | |
| CN | 111775456 A | | 10/2020 | |
| CN | 111868374 A | | 10/2020 | |
| CN | 212272436 U | | 1/2021 | |
| CN | 112360681 A | | 2/2021 | |
| CN | 112512784 B | | 5/2022 | |
| CN | 112912235 B | | 5/2022 | |
| WO | WO-2005026538 A1 | * | 3/2005 | ............. F03D 80/30 |
| WO | WO-2016177375 A1 | * | 11/2016 | ......... B29D 99/0003 |
| WO | WO-2019043248 A1 | * | 3/2019 | ............. B29C 70/30 |
| WO | 2019238606 A1 | | 12/2019 | |
| WO | 2020103991 A1 | | 5/2020 | |

OTHER PUBLICATIONS

English translation of the Written Opinion of the International Search Authority in the international application No. PCT/CN2021/100667, mailed on Sep. 6, 2021, 5 pages.
Supplementary European Search Report in the European application No. 21786313.3, mailed on Oct. 10, 2022, 9 pages.
"Huibao Curtain Wall Calculation Software User Manual", Ma Ying et al., Xi'an Jiaotong University Press, 20150430, p. 2, 4 pages.
"System Electromagnetic Compatibility", Zhao Hui, National Defense Industry Press, 20190430, p. 2, 4 pages.

* cited by examiner

LIGHTWEIGHT SPAR CAP WITH CONCAVE STRUCTURE FOR WIND TURBINE BLADE AND MANUFACTURING METHOD THEREOF, WIND TURBINE BLADE AND MANUFACTURING METHOD THEREOF

TECHNICAL FIELD

The present disclosure belongs to the technical field of wind power generation, and in particular relates to a lightweight spar cap with a concave structure for a wind turbine blade and a manufacturing method thereof, a wind turbine blade and a manufacturing method thereof.

BACKGROUND

The wind turbine mainly relies on the blade to capture wind energy. The length of the blade directly affects the ability of the wind turbine to capture wind energy and the output power of the wind turbine. The blade is increasingly long due to the performance improvement requirement. When the blade is extended, the weight increases exponentially, and the center of gravity shifts to the tip of the blade, resulting in a significant increase in gravity fatigue load and centrifugal load, reducing the reliability of the blade and the wind turbine, and increasing the cost. Therefore, the promotion of the blade extension design technology requires a lightweight blade.

The traditional blade has the following disadvantages. 1) The spar cap structure is rectangular, and the material utilization of the rectangular spar cap under the same bending rigidity cannot be maximized. 2) When the upper shell and the lower shell are assembled together, it is necessary to draw lines according to the theoretical web position, and glue claws or wooden blocks at the corresponding positions for positioning. However, affected by the measurement method and the operator, the positioning of the web is still not accurate. In addition, since it is necessary to bond and remove the claws or wood blocks, the content of the work is greatly increased. Meanwhile, the bonding structure increases the weight of the blade. 3) The double/triple-web structure is heavy. 4) The panel and the core material are heavy and have poor mechanical endurance. 5) The lightning protection system includes a copper wire, a glass fiber cloth for fixing the copper wire, a copper base, a glass fiber reinforced plastic support, an air termination device and an adhesive glue, etc., which has a complex structure and a large weight.

Therefore, it is urgently necessary for those skilled in the research of lightweight blade engineering to comprehensively consider the above factors to reduce the weight of the wind turbine blade.

SUMMARY

In order to overcome the shortcomings of the prior art and to realize a lightweight wind turbine blade, the present disclosure provides a lightweight spar cap with a concave structure for a wind turbine blade and a manufacturing method thereof, a wind turbine blade and a manufacturing method thereof.

To solve the above technical problem, the present disclosure proposes the following technical solution:

The present disclosure provides a lightweight spar cap with a concave structure for a wind turbine blade. The lightweight spar cap is groove-shaped as a whole, and includes supporting portions located on two wings of the lightweight spar cap and an intermediate connecting portion connecting the two supporting portions;

one splicing surface formed by connecting the supporting portion and the intermediate connecting portion is an integral plane; the shape of the integral plane is configured to be consistent with an inner side of an upper shell or a lower shell of the wind turbine blade for abutting;

the other splicing surface formed by connecting the supporting portion and the intermediate connecting portion is a groove-shaped discontinuous plane; a positioning groove formed by the groove-shaped discontinuous plane is configured to be consistent with an end of a web of the wind turbine blade for abutting and nesting.

Preferably, a cross section of the intermediate connecting portion may be in a trapezoidal shape; a reinforcing body of the cross section may be formed by sequentially superimposing multiple layers of reinforcing fiber cloth from an upper base to a lower base of a trapezoid; the cross section of the reinforcing body formed by superimposing the reinforcing fiber cloths may present a trapezoidal shape.

The reinforcing body formed by superimposing the reinforcing fiber cloths provides rigidity and strength for the concave spar cap. The intermediate connecting portion serving as the main bearing structure is a trapezoidal structure, which provides rigidity and strength for the lightweight spar cap. Compared with a rectangular spar cap, the lightweight spar cap has a larger area moment. Under the same bending rigidity, the lightweight spar cap is lighter than the rectangular spar cap, which can achieve the purpose of reducing the weight of the blade.

Preferably, the reinforcing fiber cloth may be a carbon fiber cloth layer, and the reinforcing body may be made of carbon fiber cloths with equal widths in staggered layers to form a trapezoidal cross section.

The intermediate connecting portion made of carbon fiber cloth layers with equal widths is tidier, making the processing easier.

Preferably, a thickness of the supporting portion may be greater than that of the intermediate connecting portion, and the supporting portion may wrap a lateral side of the intermediate connecting portion into an inverted trapezoidal groove. The structure of the supporting portion is designed according to the intermediate connecting portion, which is helpful for the combination of the internal structure of the spar cap, improves the stability of the lightweight spar cap, and facilitates the formation of a concave groove to locate the web.

Preferably, an inclined surface may be provided at an outer corner of the supporting portion, and the inclined surface may be kept substantially parallel to the trapezoidal lateral side of the intermediate connecting portion. The inclined surface at the corner facilitates a smooth transition with the adjacent structure, and avoids the formation of thickness steps, which cause stress concentration of the blade. The supporting portion, the intermediate connecting portion and the adjacent structure are integrated by resin bonding.

Preferably, the supporting portion may adopt a reinforcing material composed of one or more from the group consisting of balsa, polyvinyl chloride (PVC), polyethylene terephthalate (PET) and high-density polyethylene (HPE); the supporting portion and the intermediate connecting portion may be integrally molded by resin infusion.

The supporting portion and the intermediate connecting portion are connected through resin infusion, which avoids the need to use an additional glue and to reserve a bonding gap, and achieves simple molding and convenient operation. The commonly used materials for the intermediate connecting portion and the supporting portion include a resin. On this basis, through resin infusion molding, the adhesion between the resin and the core material and the reinforcing layer is improved, thereby enhancing the strength of the lightweight spar cap.

Under the same technical concept, the present disclosure further provides a method for manufacturing the lightweight spar cap with a concave structure for a wind turbine blade. The method includes the following steps:

(1) laying the reinforcing material of the intermediate connecting portion on a spar cap mold, such that the reinforcing body of the intermediate connecting portion presents a trapezoidal shape, and the lower base of the trapezoidal reinforcing body abuts against a surface of the spar cap mold;

(2) placing the reinforcing material of the supporting portion on both sides of the reinforcing body of the intermediate connecting portion, such that the reinforcing material of the supporting portion wraps the trapezoidal lateral side of the reinforcing body to form the positioning groove that is able to match with the end of the web of the wind turbine blade later, thereby obtaining a composite body of reinforcing materials; and (3) subjecting the composite body of reinforcing materials obtained in the above step to an integral resin infusion process, to finally obtain the lightweight spar cap for the wind turbine blade.

Preferably, the laying the reinforcing material of the intermediate connecting portion may specifically include: laying carbon fiber cloth layers with equal widths in a staggered manner, where each carbon fiber cloth layer may have a size of L; a first layer may have a distance of D from a left end of the spar cap mold, a second layer may have a distance of D+L from the left end of the spar cap mold, and so on, until an (N+1)-th layer may have a distance of D from a right end of the spar cap mold. In this way, the laying of the intermediate connecting portion is completed. The width of the carbon fiber cloth is denoted as A. By laying the carbon fiber cloth layers in a staggered manner, the trapezoidal structure required for the intermediate connecting portion is formed. Compared with an ordinary panel, the trapezoidal structure reduces the weight of the spar cap structure.

The spar cap mold is provided with a diversion system and an air extraction system, and it is continuously heated during the production process. The diversion system and the air extraction system are designed to facilitate the introduction of the resin, and the air extraction system exerts a vacuum pressure to pump the resin into the spar cap mold. The heating temperature is program-controlled, which is helpful for the curing and shaping of the intermediate connecting portion, the supporting portion and the resin.

Under the same technical concept, the present disclosure further provides a lightweight spar cap structure combination for a wind turbine blade. The lightweight spar cap structure combination includes a web and two lightweight spar caps for the wind turbine blade, where the lightweight spar caps for the wind turbine blade are concave spar caps, and the two concave spar caps include a pressure surface lightweight spar cap and a suction surface lightweight spar cap;

a positioning structure is provided on one side of each of the pressure surface lightweight spar cap and the suction surface lightweight spar cap; double ends of the web are respectively connected with the positioning structures of the pressure surface lightweight spar cap and the suction surface lightweight spar cap through a positioning matching structure, and are fixedly connected with the pressure surface lightweight spar cap and the suction surface lightweight spar cap as a whole.

Preferably, the positioning structure and the positioning matching structure may adopt a groove matching positioning mode; one of the positioning structure and the positioning matching structure may be configured as a positioning groove, and the other thereof may be configured as an insert that fits with the positioning groove.

Preferably, the groove matching positioning mode may be any one of the following:

the positioning groove is a trapezoidal groove respectively provided on the pressure surface lightweight spar cap and the suction surface lightweight spar cap, and the insert is an upper base plate and a lower base plate which are respectively provided at double ends of the web and matched with the trapezoidal groove; or the positioning groove is a V-shaped groove respectively provided on the pressure surface lightweight spar cap and the suction surface lightweight spar cap, and the insert is a positioning rib respectively provided at double ends of the web.

Preferably, the web may be in an I-shape, and may include an upper base plate and a lower base plate located at upper and lower ends and matched with the trapezoidal groove.

Preferably, the pressure surface lightweight spar cap and the suction surface lightweight spar cap may be respectively groove-shaped, and may include supporting portions located on two wings of the lightweight spar cap and an intermediate connecting portion connecting the two supporting portions;

one splicing surface formed by connecting the supporting portion and the intermediate connecting portion may be an integral plane; the shape of the integral plane may be configured to be consistent with an inner side of an upper shell or a lower shell of the wind turbine blade for abutting;

the other splicing surface formed by connecting the supporting portion and the intermediate connecting portion may be a groove-shaped discontinuous plane; a positioning groove formed by the groove-shaped discontinuous plane may be configured to be consistent with an end of a web of the wind turbine blade for abutting and nesting.

Under the same technical concept, the present disclosure further provides a lightweight wind turbine blade. The lightweight wind turbine blade includes an upper shell, a lower shell and the lightweight spar cap structure combination, where one end of the lightweight spar cap structure combination for the wind turbine blade is connected with the upper shell, and the other end thereof is connected with the lower shell; the lightweight spar cap structure combination for the wind turbine blade is fixedly connected with the upper shell and the lower shell as a whole; double ends of the upper shell and the lower shell are correspondingly connected to form a leading edge and a trailing edge respectively.

Preferably, in the lightweight spar cap structure combination, a trailing edge web may be provided in a trailing edge chamber defined by the web and the trailing edge.

Preferably, a starting point of the trailing edge web along a length direction of the blade may be provided in a region that contributes 12% to 15% to a total length of the blade from a blade root, and an end point of the trailing edge web along the length direction of the blade may be provided in a region that contributes 57% to 60% to the total length of the blade from the blade root; a height of the trailing edge web may be smaller than that of the web, and the trailing edge web is substantially parallel to the web.

Preferably, the upper shell and the lower shell may be made of a compressive and shear resistant composite material; the composite material may include a core material and glass fiber fabrics adhered on upper and lower surfaces of the core material; the core material may use a sandwich panel as a support; a path may be formed in the sandwich panel to place a fiber bundle; a vertical fiber column, a diagonal fiber column, a longitudinal fiber rib and a transverse fiber rib may be formed in the sandwich panel by a dipping process; the diagonal fiber column, the longitudinal fiber rib and the transverse fiber rib may form a lattice type fence that is vertically and horizontally interwoven and integrally bonded in the sandwich panel; the glass fiber fabrics adhered on the upper and lower surfaces of the sandwich panel may be bonded with the vertical fiber column and the lattice type fence to form an integral structure. The core material of the overall structure constructed by the glass fiber fabric, the vertical fiber column and the lattice type fence has strong compressive and shear resistant properties, which improves the load-bearing capacity and strength of the shell of the wind turbine blade.

Preferably, the compressive and shear resistant core material may be able to withstand multi-directional pressure and shear force; the sandwich panel may be made of any one or more from the group consisting of balsa, PVC, PET and HPE; the shell of the wind turbine blade may adopt a carbon fiber-glass fiber composite material, which may be a hybrid design of carbon fiber and glass fiber in a mass ratio of (10-90):(10-90).

Preferably, the lightweight wind turbine blade may further include a lightning protection system; the lightning protection system may include a carbon fiber cloth layer wrapping a surface of the upper shell and/or the lower shell, at least one layer of metal belt and a down conductor that may be connected with a wind turbine lightning protection system; the carbon fiber cloth layer may conduct a lightning current to the metal belt; the metal belt may be connected with the down conductor through a wire.

The present disclosure applies the carbon fiber cloth layer to the lightning protection system. The carbon fiber cloth is laid on the surface of the blade and connected to the root wire of the lightning protection system through the down conductor. When the blade is struck by lightning, the lightning current is conducted to the wind turbine lightning protection system. The carbon fiber cloth can bear the structural load, and can also conduct the lightning current to the down conductor, thereby assuming the dual role of conductor and load-bearing structure in the blade lightning protection system. It can effectively reduce the weight of the blade lightning protection system, increase the range of air termination, and improve the air termination efficiency of the blade, thereby effectively protecting the blade.

Preferably, the carbon fiber cloth layer may conduct the lightning current to the at least one layer of metal belt through at least one additional carbon fiber cloth layer; a width of the carbon fiber cloth layer may depend on a lightning current carrying capacity of a carbon fiber material, and a minimum requirement may be that the lightning current passes through the carbon fiber cloth layer without damaging the carbon fiber cloth layer.

Preferably, there may be multiple additional carbon fiber cloth layers and multiple layers of metal belts; the multiple additional carbon fiber cloth layers and the multiple layers of metal belts may be alternately arranged, such that the lightning may be dispersed to the multiple layers of metal belts through the multiple additional carbon fiber cloth layers and may be finally conducted to the down conductor.

Multiple additional carbon fiber cloth layers and metal belts are arranged between the carbon fiber cloth layer and the down conductor, and the additional carbon fiber cloth layers alternately superimposed with the carbon fiber cloth layers and the metal belts to reduce the sudden change of resistance from the carbon fiber cloth layers to the metal belts. When the lightning current is conducted from the carbon fiber cloth layer to the down conductor, this design reduces the damage of the lightning current to the carbon fiber near the carbon fiber cloth layer, and reduces the damage to the wind turbine blade using the carbon fiber cloth lightning protection system.

Preferably, a superimposed area of each additional carbon fiber cloth layer may be the same, and each additional carbon fiber cloth layer completely covers the metal belt. The ability of the superimposed carbon fiber cloth layers to pass current reaches a lightning current standard of 200 KA.

Preferably, the carbon fiber cloth layer may be laid from a blade tip to the blade root; a connection point of the metal belt and the carbon fiber cloth along the length direction of the blade may be located in a region that contributes 30% to the total length of the wind turbine blade from the blade root; the carbon fiber cloth layer and the metal belt may be connected with the blade by integral infusion.

The wind turbine lightning protection system is mostly provided in the blade root. The down conductor and the wire are connected with the metal belt, and the connection point of the metal belt and the carbon fiber cloth is close to the blade root, so as to approach the lightning protection system, which can save the consumption of the down conductor and the wire, thereby reducing the overall weight of the lightning protection system.

The wind turbine blade is narrow in the tip and wide in the root. The connection point of the metal belt and the carbon fiber cloth is provided close to the blade root, which provides a large operation space for mounting and for the arrangement of the additional carbon fiber layer, thereby facilitating the operation of the staff.

Preferably, the metal belt may pass through the blade shell and extend into the blade chamber to be twisted into a strand, and may be connected with the wire through a doubling device; upper and lower wires may be connected with the down conductor through a wire doubling device; the down conductor may be connected with the wind turbine lightning protection system at the blade root.

The carbon fiber cloth layer is laid on the surface of the shell through infusion for air termination. It expands the air termination area, improves the air termination efficiency, and guides the lightning to the down conductor at the blade root. Meanwhile, the gap reserved in the shell for the metal belt and the wire to pass through is filled by the integral infusion, so as to achieve a waterproof effect.

Under the general technical concept, the present disclosure further provides a method for manufacturing a lightweight wind turbine blade. The method includes the following steps:

- step 1: respectively fixedly connecting a pressure surface lightweight spar cap and a suction surface lightweight spar cap, which are respectively provided with a positioning groove, with an upper shell and a lower shell as a whole;
- step 2: placing the suction surface lightweight spar cap fixedly connected with the lower shell as a whole upwards, and applying a structural glue to the positioning groove of the lower shell; lifting a web onto the suction surface lightweight spar cap, and inserting a lower base plate of the web into the positioning groove coated with the structural glue to realize the positioning and fixing of the web on the suction surface lightweight spar cap; and step 3: applying a structural glue to an outer surface of an upper base plate of the web, lifting the upper shell together with the pressure surface lightweight spar cap fixed with the upper shell above the web, lowering the upper shell and the pressure surface lightweight spar cap, inserting the upper base plate of the web into the positioning groove of the pressure surface lightweight spar cap, and fixedly connecting the web with the pressure surface lightweight spar cap through the applied structural glue.

Compared with the prior art, the present disclosure has the following beneficial effects;

1. In the lightweight spar cap with a concave structure for a wind turbine blade and the manufacturing method thereof proposed by the present disclosure, the spar cap is a lightweight concave spar cap, which has a trapezoidal main bearing structure composed of fiber reinforcing layers. Compared with a rectangular spar cap, the lightweight spar cap has a larger area moment. Under the same bending rigidity, the lightweight spar cap is lighter than the rectangular spar cap, which can achieve the purpose of reducing the weight of the blade.
2. In the wind turbine blade proposed by the present disclosure, the wind turbine blade with a concave structure is fixed with the lightweight spar cap and the web, and an integrated positioning groove is provided on the lightweight spar cap. During assembling, the web can be accurately and stably provided on the lightweight spar cap, which facilitates the further assembly of the spar cap and the shell. There is no need to temporarily add any auxiliary facilities, making the entire assembly process simple and efficient.
3. In the lightweight spar cap structure combination for a wind turbine blade proposed by the present disclosure, the combination of the single web and the lightweight spar cap structure reduces the weight of the web to achieve a lightweight wind turbine blade.
4. In the lightweight wind turbine blade proposed by the present disclosure, the web is combined with the small web at the trailing edge, and the weight of the web is greatly reduced compared with the traditional wind turbine blade. The small web at the trailing edge increases the strength of the trailing edge, and reduces the bonding width of the trailing edge, thereby achieving the purpose of reducing the weight of the blade.
5. In the lightweight wind turbine blade proposed by the present disclosure, a special compressive and shear resistant core material is used, and a compressive integral structure capable of withstanding multi-directional pressure is constructed inside and outside the core material, which improves the strength and stability of the blade.
6. In the lightweight wind turbine blade proposed by the present disclosure, the carbon fiber cloth is applied to the lightning protection system. When the blade is struck by lightning, the lightning current is conducted to the wind turbine lightning protection system. The carbon fiber cloth can bear the structural load, and can also conduct the lightning current to the down conductor, thereby assuming the dual role of conductor and load-bearing structure in the blade lightning protection system. Such a design can reduce the weight of the blade lightning protection system, and can effectively protect the blade.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description merely show some embodiments of the present disclosure, and a person of ordinary skill in the art may still derive other accompanying drawings from these accompanying drawings without creative efforts.

Figure 1:
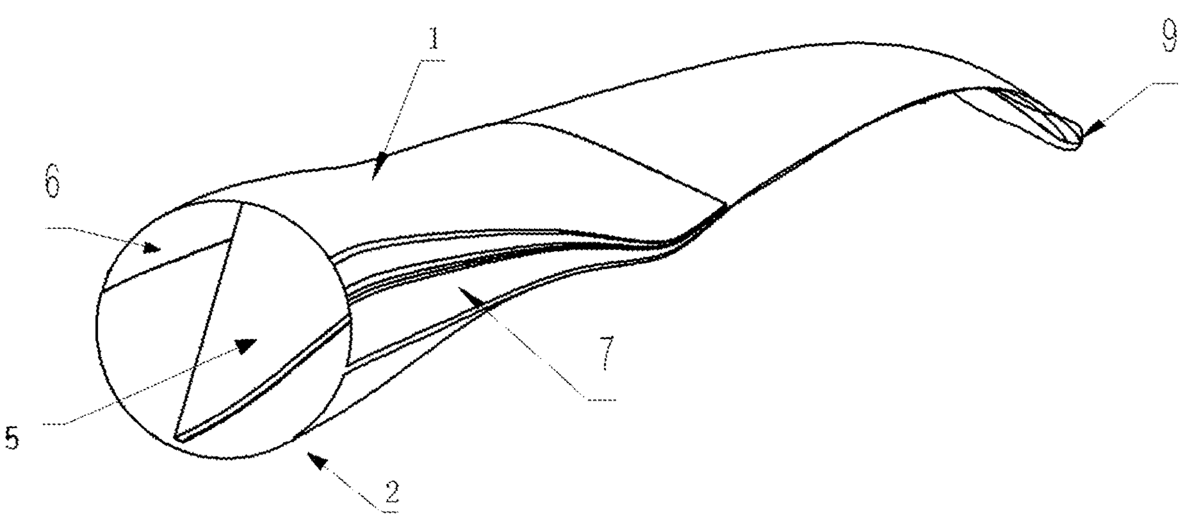
FIG. 1 is an overall external view of a wind turbine blade.
Figure 2:
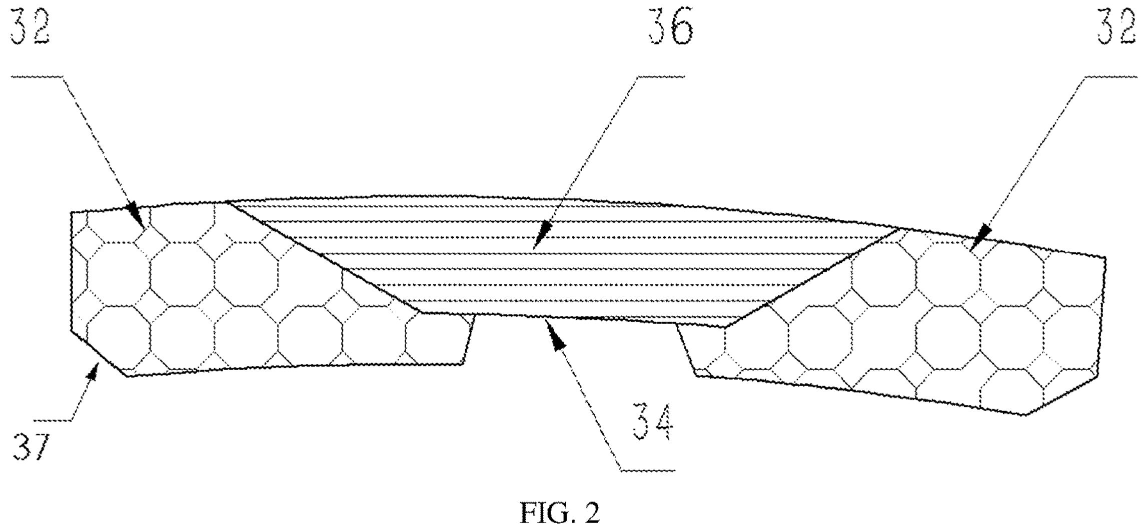
FIG. 2 is a cross-sectional view of a lightweight spar cap.

Reference Numerals: 1. upper shell; 2. lower shell; 3. pressure surface lightweight spar cap; 4. suction surface lightweight spar cap; 5. web; 6. leading edge; 7. trailing edge; 8. trailing edge web; 9. sandwich panel; 31. upper positioning groove; 41. lower positioning grove; 32. supporting portion; 33. left end of spar cap mold; 34. positioning groove; 35. right end of spar cap mold; 36. intermediate connecting portion; 37. inclined surface; 51. upper base plate; 52. lower base plate; 53. upper positioning rib; 54. lower positioning rib; 61. starting point; 62. end point; 63. blade root; 81. vertical fiber column; 82. diagonal fiber column; 83. longitudinal fiber rib; 84. transverse fiber rib; 85. lattice type fence; 86. glass fiber fabric; 91. carbon fiber cloth layer; 92. additional carbon fiber cloth layer; 93. metal belt; 94. wire doubling device; 95. doubling device; 96. down conductor.

DETAILED DESCRIPTION

In order to facilitate the understanding of the present disclosure, the present disclosure is described in detail below in conjunction with the accompanying drawings of the specification and the preferred embodiments, but the protection scope of the present disclosure is not limited to the following specific embodiments.

Unless otherwise defined, all professional terms used in the following have the same meaning as commonly understood by those skilled in the art. The terms used herein are only intended for the purpose of describing the specific embodiments, rather than to limit the protection scope of the present disclosure.

Unless otherwise specified, the various raw materials, reagents, instruments and devices used in the present disclosure may be purchased from the market or may be manufactured by using existing methods.

Embodiment 1

The present disclosure provides a lightweight spar cap for a wind turbine blade. As shown in FIGS. 1 to 10, the lightweight spar cap is groove-shaped as a whole, and includes supporting portions 32 located on two wings of lightweight spar cap and an intermediate connecting portion 36 connecting the two supporting portions 32.

One splicing surface formed by connecting supporting portion 32 and the intermediate connecting portion 36 is an integral plane. The shape of the integral plane is configured to be consistent with an inner side of an upper shell 1 or a lower shell 2 of the wind turbine blade for abutting.

The other splicing surface formed by connecting supporting portion 32 and the intermediate connecting portion 36 is a groove-shaped discontinuous plane. A positioning groove 34 formed by the groove-shaped discontinuous plane is configured to be consistent with an end of a web 5 of the wind turbine blade for abutting and nesting.

A cross section of the intermediate connecting portion 36 is in a trapezoidal shape. A reinforcing body of the intermediate connecting portion is formed by sequentially superimposing multiple layers of reinforcing fiber cloths from a trapezoidal upper base to a lower base. The cross section of the reinforcing body formed by superimposing the reinforcing fiber cloths finally presents a trapezoidal shape. The reinforcing fiber cloth is a carbon fiber cloth layer, and the carbon fiber cloth layers with equal widths are laid in a staggered manner to form the trapezoidal reinforcing body (shown in FIG. 3). The supporting portion 32 adopts a reinforcing material composed of one or more from the group consisting of balsa, polyvinyl chloride (PVC), polyethylene terephthalate (PET) and high-density polyethylene (HPE). A thickness of the supporting portion is greater than that of the intermediate connecting portion 36, and the supporting portion wraps a lateral side of the intermediate connecting portion 36 into an inverted trapezoidal groove (i.e. a positioning groove 34). The supporting portion 32 and the intermediate connecting portion 36 are integrally molded by resin infusion.

An inclined surface 37 is provided at an outer corner of the supporting portion 32, and the inclined surface 37 is kept substantially parallel to the trapezoidal lateral side of the intermediate connecting portion 36. The inclined surface can form a smooth transition with the core material structure of the blade shell beside the spar cap in the height direction so as to avoid the formation of thickness steps.

In this embodiment, a method for manufacturing the lightweight spar cap for a wind turbine blade includes:

(1) Clean a spar cap mold, provide a diversion system on a surface of the spar cap mold, and continuously heat the mold.

Figure 3:
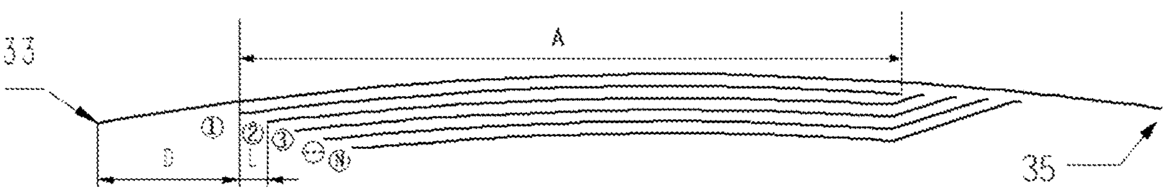
FIG. 3 is a schematic diagram of reinforcing fiber cloths laid on the lightweight spar cap.

(2) Lay carbon fiber cloths of equal widths in a staggered manner on a lower surface of the spar cap mold, as shown in FIG. 3, where each carbon fiber cloth layer has a size of 10 mm; a first layer has a distance of D, that is, 150 mm, from a left end 33 of the spar cap mold, a second layer has a distance of D+L, that is, 160 mm, from the left end 33 of the spar cap mold, and so on, until an eleventh layer has a distance of D, that is, 150 mm, from a right end 35 of the spar cap mold. In this way, the intermediate connecting portion 36 is formed into a trapezoidal laid structure, which has trapezoidal chamfers on two ends and a trapezoidal lower base abutting against the lower surface of the spar cap mold.

(3) Lay a reinforcing material of the supporting portion 32 on both sides of the reinforcing body of the intermediate connecting portion 36, such that the reinforcing material of the supporting portion 32 wraps the trapezoidal lateral side of the reinforcing body of the intermediate connecting portion 36 to form the positioning groove 34 that is able to match with an upper base plate 51 and a lower base plate 52 on double ends of the web 5 of the wind turbine blade later, thereby obtaining a composite body of reinforcing materials, where the positioning groove specifically includes an upper positioning groove 31 and a lower positioning groove 41.

There is a small gap between an inner shaped surface of the positioning groove 34 and upper and lower end surfaces of the web 5, such that the web 5 can be placed in the upper positioning groove 31 and the lower positioning groove 41 and a structural glue can be retained in this small gap. During and after assembly, the upper base plate 51 and the lower base plate 52 are respectively located in the upper positioning groove 31 and the lower positioning groove 41 and are fixed by the structural glue applied in advance.

(4) Provide a diversion system on an upper surface of the lightweight spar cap with the laid cloth layers, lay on the upper surface of the spar cap mold, and provide an air extraction system.

(5) Exert a vacuum pressure of the air extraction system to introduce a resin, control a heating temperature of the mold, and perform curing.

(6) Stop heating to complete the curing and shaping, demold and trim, to obtain the lightweight spar cap for a wind turbine blade.

In this embodiment, a lightweight spar cap structure combination for a wind turbine blade includes a web 5 and two lightweight spar caps for the wind turbine blade. The lightweight spar caps for the wind turbine blade are concave spar caps, and the two concave spar caps include a pressure surface lightweight spar cap 3 and a suction surface lightweight spar cap 4.

A longitudinal positioning structure is provided on one side of each of the pressure surface lightweight spar cap 3 and the suction surface lightweight spar cap 4. Double ends of the web 5 are respectively connected with the positioning structures of the pressure surface lightweight spar cap 3 and the suction surface lightweight spar cap 4 through a positioning matching structure, and are fixedly connected with the pressure surface lightweight spar cap 3 and the suction surface lightweight spar cap 4 as a whole.

Figure 4:
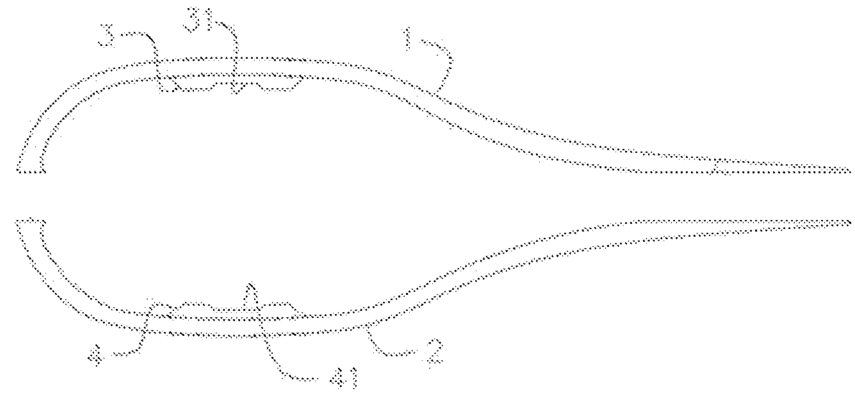
FIG. 4 is a cross-sectional view of a lightweight spar cap of Embodiment 1 connected with a blade shell.

As shown in FIG. 4, in this embodiment, the positioning structure and the positioning matching structure adopt a groove matching positioning mode. Specifically, the positioning structure is configured as a positioning groove 34, and the positioning matching structure is configured as an insert that fits with the positioning groove 34.

Figure 5:
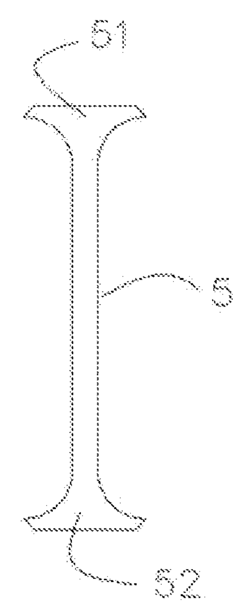
FIG. 5 is a cross-sectional view of a web of Embodiment 1.

The positioning groove 34 is a trapezoidal groove respectively provided on the pressure surface lightweight spar cap 3 and the suction surface lightweight spar cap 4, and the insert is a base plate. In this embodiment, the base plate includes the upper base plate 51 and the lower base plate 52 which are respectively provided at double ends of the web 5. As shown in FIG. 5, the web 5 is I-shaped, and includes the upper base plate 51 and the lower base plate 52 that are located on upper and lower ends and matched with the trapezoidal groove.

Figure 6:
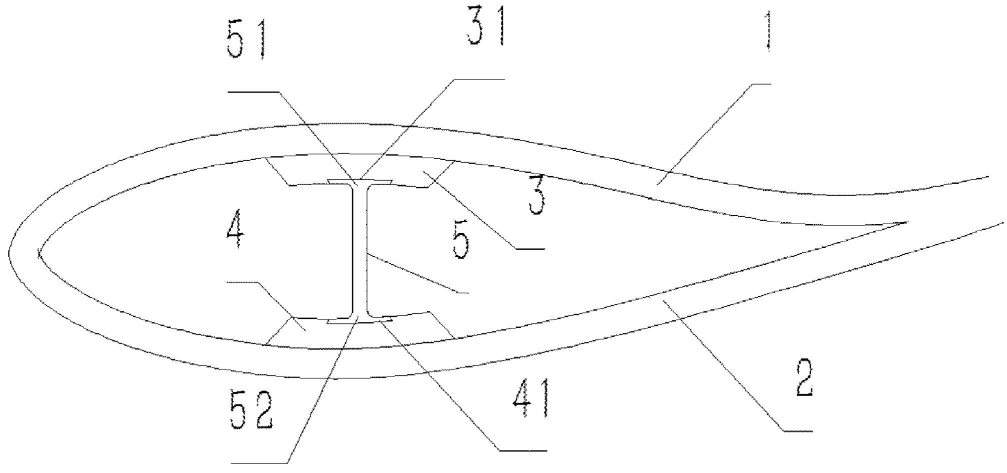
FIG. 6 is a cross-sectional view of a lightweight spar cap structure combination of Embodiment 1 assembled with a wind turbine blade shell.

As shown in FIG. 6, the pressure surface lightweight spar cap 3 is provided with an upper positioning groove 31, and the suction surface lightweight spar cap is provided with a lower positioning groove 41. An inner shaped surface of the upper positioning groove 31 and an inner shaped surface of the lower positioning groove 41 are matched with shaped surfaces of the upper base plate 51 and the lower base plate 52 respectively. The upper base plate 51 and the lower base plate 52 are respectively located in the upper positioning groove 31 of the pressure surface lightweight spar cap 3 and the lower positioning groove 41 of the suction surface lightweight spar cap 4.

Embodiment 2

Figure 11:
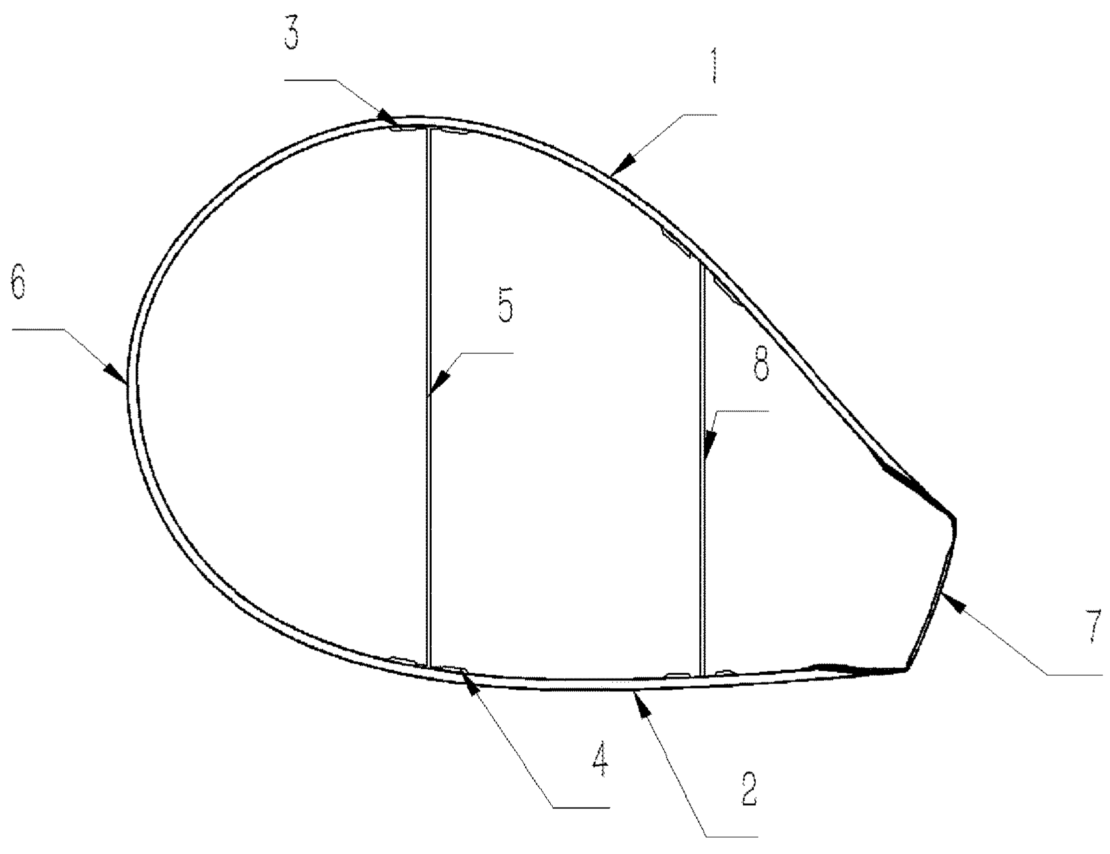
FIG. 11 is a cross-sectional view of a wind turbine blade of Embodiment 2.
Figure 12:
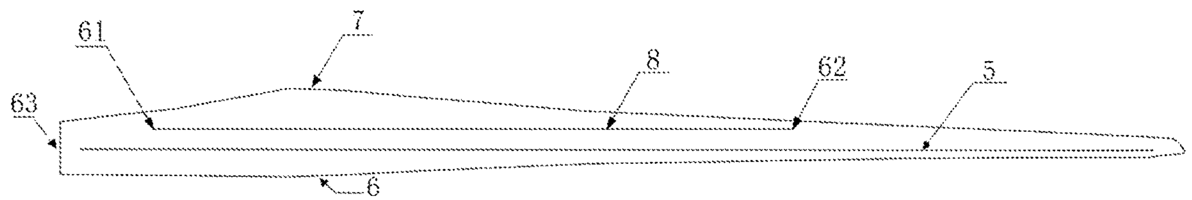
FIG. 12 is a schematic diagram of a trailing edge web on a side of the wind turbine blade in Embodiment 2.

The present disclosure further provides a lightweight wind turbine blade. The lightweight wind turbine blade includes an upper shell 1, a lower shell 2 and the lightweight spar cap structure combination. One end of the lightweight spar cap structure combination for the wind turbine blade is connected with the upper shell 1, and the other end thereof is connected with the lower shell 2. The lightweight spar cap structure combination for the wind turbine blade is fixedly connected with the upper shell 1 and the lower shell 2 as a whole. The lightweight spar cap structure combination of the wind turbine blade in this embodiment is substantially the same as that of Embodiment 1, except that there are two lightweight spar cap structure combinations provided in this embodiment. Specifically, as shown in FIG. 11, butt joints on both sides of the upper shell 1 and the lower shell 2 respectively form the leading edge 6 and the trailing edge 7 of the wind turbine blade. Among the two lightweight spar cap structure combinations of the wind turbine blade, one lightweight spar cap structure combination for the wind turbine blade is exactly the same as that in Embodiment 1, which includes a web 5 and two lightweight spar caps described in Embodiment 1; a trailing edge web 8 is further provided in a trailing edge chamber formed by the web 5 and the trailing edge 7. The structure and composition of the trailing edge web 8 are substantially the same as the lightweight spar cap structure combination for the wind turbine blade in Embodiment 1, except that the height and shape are slightly different. As shown in FIG. 12, a starting point 61 of the trailing edge web 8 along a length direction of the blade is provided in a region that contributes 12% to 15% to a total length of the blade from a blade root 63, and an end point 62 of the trailing edge web 8 along the length direction of the blade is provided in a region that contributes 57% to 60% to the total length of the blade from the blade root 63. A height of the trailing edge web is smaller than that of the web 5, and the trailing edge web is substantially parallel to the web 5.

Embodiment 3

Figure 13:
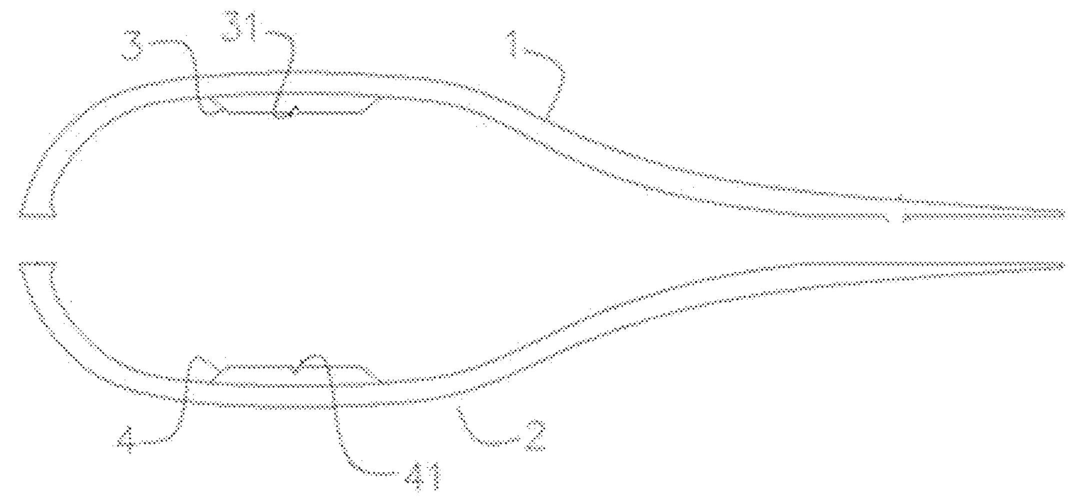
FIG. 13 is a cross-sectional view of a lightweight spar cap of Embodiment 3 connected with a wind turbine blade shell.
Figure 14:
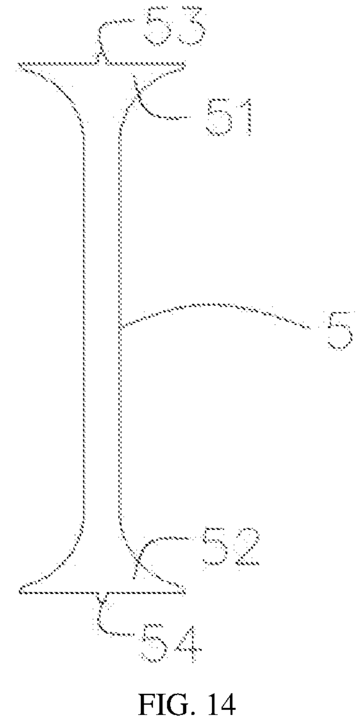
FIG. 14 is a cross-sectional view of a web of Embodiment 3.
Figure 15:
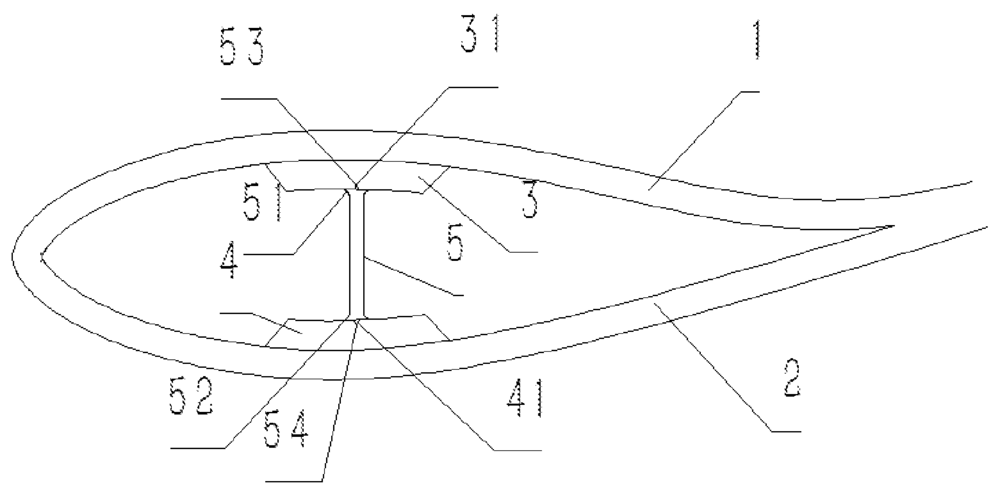
FIG. 15 is a cross-sectional view of a lightweight spar cap structure combination of Embodiment 3 assembled with a wind turbine blade shell.

The present disclosure provides another lightweight spar cap for a wind turbine blade. As shown in FIGS. 13 to 15, the overall structure, material and manufacturing method of the lightweight spar cap are the same as those in Embodiments 1 and 2, except that the lightweight spar cap is provided with a V-shaped groove.

As shown in FIGS. 13 to 15, in this embodiment, a lightweight spar cap structure combination includes a web 5 and two lightweight spar caps as described in the above embodiment. The lightweight spar caps for the wind turbine blade are concave spar caps, and the two concave spar caps include a pressure surface lightweight spar cap 3 and a suction surface lightweight spar cap 4. A longitudinal positioning structure is provided on one side of each of the pressure surface lightweight spar cap 3 and the suction surface lightweight spar cap 4. Double ends of the web 5 are respectively connected with the positioning structures of the pressure surface lightweight spar cap 3 and the suction surface lightweight spar cap 4 through a positioning matching structure, and are fixedly connected with the pressure surface lightweight spar cap 3 and the suction surface lightweight spar cap 4 as a whole.

The positioning structure and the positioning matching structure adopt a groove matching positioning mode. Specifically, the positioning structure is configured as a positioning groove 34, and the positioning matching structure is configured as an insert that fits with the positioning groove 34.

The positioning groove 34 is a V-shaped groove respectively provided on the pressure surface lightweight spar cap 3 and the suction surface lightweight spar cap 4, and the insert is a positioning rib respectively provided at double ends of the web 5. The web 5 is I-shaped, and includes the upper base plate 51 and the lower base plate 52 that are located on upper and lower ends and matched with the trapezoidal groove. The upper base plate 51 and the lower base plate 52 are respectively provided with a positioning rib.

An upper top surface of the upper base plate 51 and a lower bottom surface of the lower base plate 52 are respectively provided with a longitudinal upper positioning rib 53 and a lower positioning rib 54. An inner shaped surface of the upper positioning groove 31 and an inner shaped surface of the lower positioning groove 41 are matched with outer shaped surfaces of the upper positioning rib 53 and the lower positioning rib 54 respectively. The upper positioning rib 53 of the upper base plate 51 of the I-shaped web 5 is provided in the upper positioning groove 31 of the pressure surface lightweight spar cap 3. The lower positioning rib 54 of the lower base plate 52 of the I-shaped web 5 is provided in the lower positioning groove 41 of the suction surface lightweight spar cap 4.

The present disclosure further provides a lightweight wind turbine blade. As shown in FIG. 15, the lightweight wind turbine blade includes an upper shell 1, a lower shell 2 and the lightweight spar cap structure combination as described in the above embodiment. One end of the lightweight spar cap structure combination for the wind turbine blade is connected with the upper shell 1, and the other end thereof is connected with the lower shell 2. The lightweight spar cap structure combination for the wind turbine blade is fixedly connected with the upper shell 1 and the lower shell 2 as a whole.

The manufacturing method of the lightweight spar cap for the wind turbine blade in this embodiment is substantially the same as that of Embodiment 1, except that the shape of the groove is slightly different.

In the above embodiments, the upper shell 1 and the lower shell 2 of the wind turbine blade use a compressive and shear resistant composite material that is able to withstand multi-directional pressure and shear force. The composite material includes a core material and glass fiber fabrics 86 adhered on upper and lower surfaces of the core material. The core material uses a sandwich panel 9 as a support. A path is formed in the sandwich panel to place a fiber bundle. A vertical fiber column 81, a diagonal fiber column 82, a longitudinal fiber rib 83 and a transverse fiber rib 84 are formed in the sandwich panel 9 by a dipping process. The diagonal fiber column 82, the longitudinal fiber rib 83 and the transverse fiber rib 84 form a lattice type fence 85 that is vertically and horizontally interwoven and integrally bonded in the sandwich panel 9. The glass fiber fabrics 86 are adhered on the upper and lower surfaces of the sandwich panel 9 before dipping, and the glass fiber fabrics 86 are bonded with the vertical fiber column 81 and the lattice type fence 85 to form an integral structure.

Figure 17:
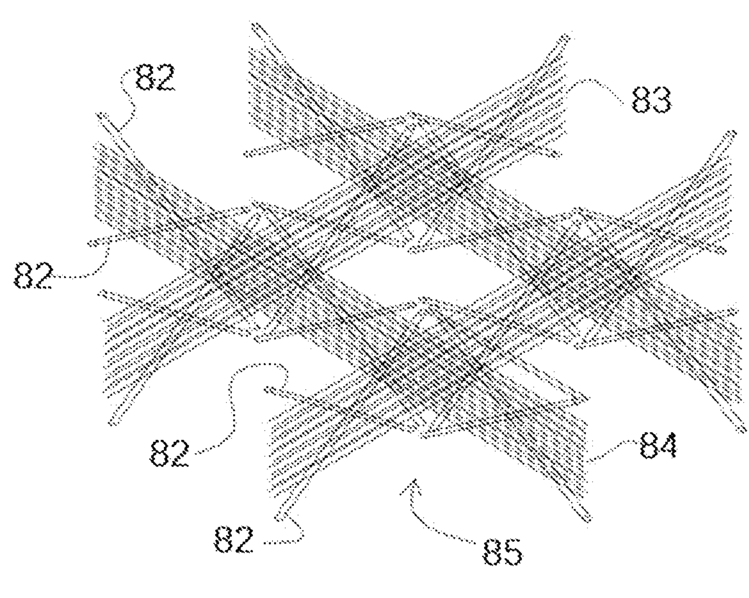
FIG. 17 is a schematic diagram of a fiber structure inside the panel.

The vertical fiber column 81 directly resists a positive pressure exerted on the sandwich panel 9 in the structure. In addition to the positive pressure, the pressure exerted on the panel also includes other pressure in various directions. Therefore, the diagonal fiber column 82 is provided in the structure. The longitudinal fiber rib 83 and the transverse fiber rib 84 bond with all the diagonal fiber columns 82 to an integral frame through a glue. They enhance the stability of each diagonal fiber column 82 in case of pressure, and significantly enhance the compressive performance of the sandwich panel 9 against pressure in all directions. The longitudinal fiber rib 83 and the transverse fiber rib 84 also significantly enhance the tensile performance of the sandwich panel 9 in the horizontal direction. As shown in FIG. 17, the lattice type fence 85 is actually only a description of a part of the mechanical overall structure constructed in the sandwich panel 9.

Figure 16:
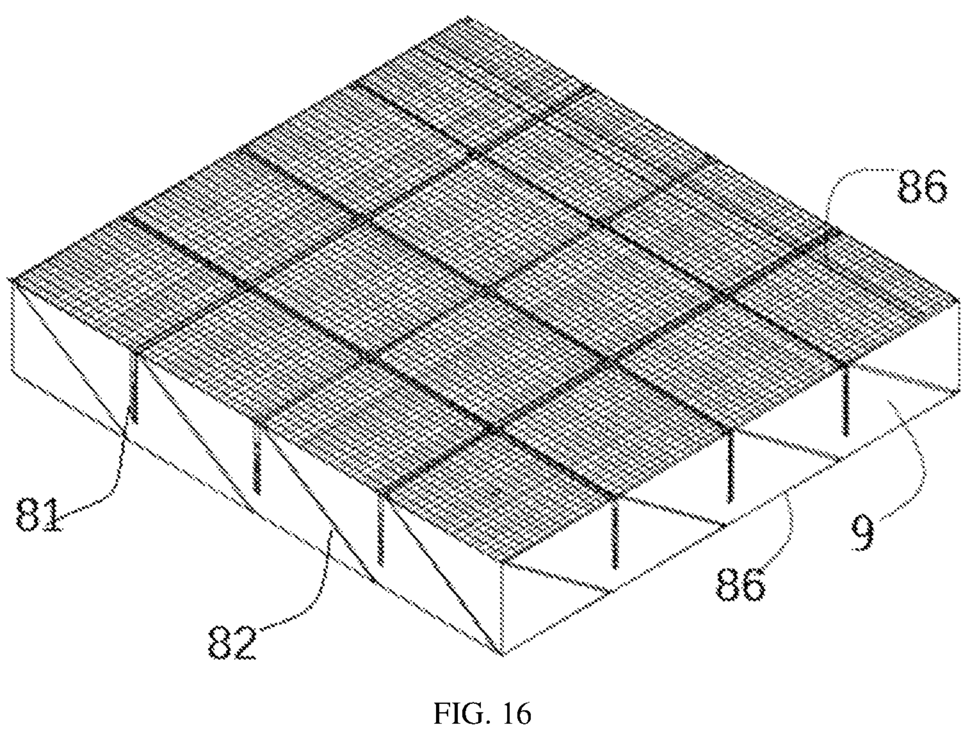
FIG. 16 is a schematic diagram of a compressive panel.

As shown in FIGS. 16 and 17, the diagonal fiber column 82, the longitudinal fiber rib 83 and the transverse fiber rib 84 form a lattice type fence 85 that is vertically and horizontally interwoven and integrally bonded in the sandwich panel 9. That is, two transversely adjacent diagonal fiber columns 82 in the sandwich panel 9 are bonded to two sides of the longitudinal fiber rib 83 in an X shape, and two longitudinally adjacent diagonal fiber columns 82 in the sandwich panel 9 are bonded to two sides of the transverse fiber rib 84 in an X shape. Meanwhile, the adjacent longitudinal fiber rib 83 and transverse fiber rib 84 are bonded together.

To form the path to place the fiber bundle, multiple orthogonal longitudinal slits and transverse slits are equally spaced on the sandwich panel, and the sandwich panel is divided into a number of sandwich squares connected at the bottom. A vertical hole is drilled downward on the sandwich square, and diagonal holes are drilled downward along front, left, back and right sides of the sandwich square respectively.

The sandwich panel 9 used is composed of any one or more of balsa, PVC, PET and HPE. These materials are easy to cut and perforate, and various frames may be built in the panel for support. In addition, these materials are light in weight, and after being constructed into a compressive integral structure, they are sufficient to become qualified sandwich materials for the root region of the wind turbine blade shell. The glass fiber fabric is made of a carbon fiber-glass fiber composite material, which is a hybrid design of a carbon fiber and a glass fiber in a mass ratio of (10-90):(10-90).

The vertical fiber column 81, the diagonal fiber column 82, the longitudinal fiber rib 83 and the transverse fiber rib 84 are formed in the panel. The diagonal fiber column 82, the longitudinal fiber rib 83 and the transverse fiber rib 84 form a lattice type fence 85 that is vertically and horizontally interwoven and integrally bonded in the sandwich panel. The glass fiber fabrics 86 on the upper and lower surfaces are bonded with the vertical fiber column 81 and the lattice type fence 85 to form an integral frame. All of the above processes are completed by one-time dipping. Specifically, holes and slits are provided in the sandwich panel 9 to place the fiber bundles, adhere the glass fiber fabrics 86 and implement dipping and curing to form the integral structure.

The wind turbine blade of the above embodiments further includes a lightweight lightning protection system.

Figure 7:
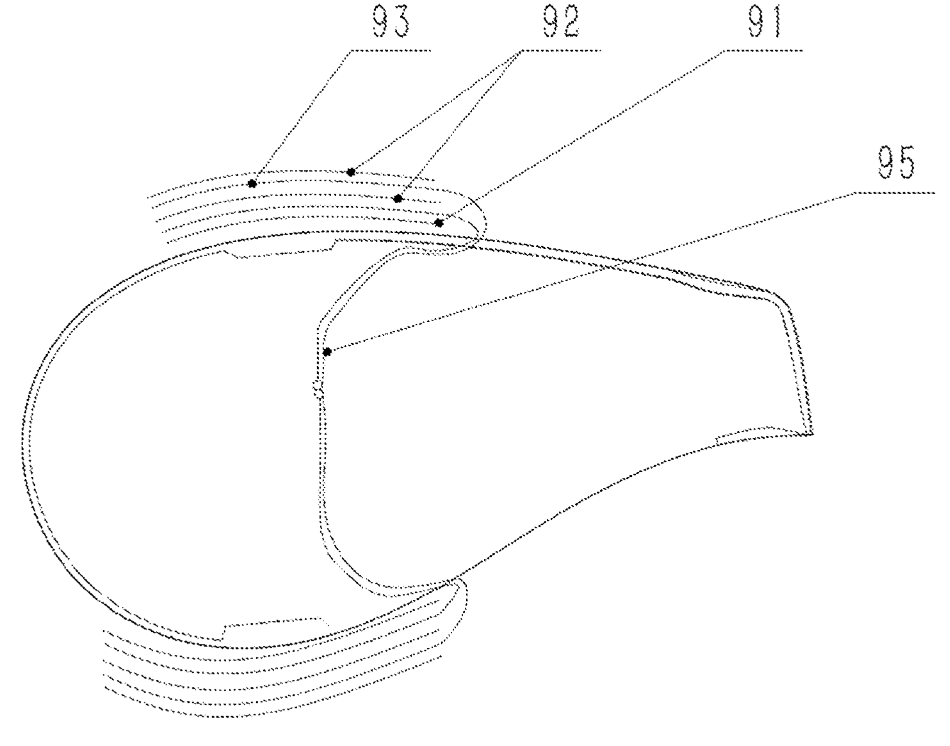
FIG. 7 is a cross-sectional view of a lightning protection system of the wind turbine blade of Embodiment 1.

As shown in FIG. 7, the lightning protection system adopts a carbon fiber cloth layer. The lightning protection system is composed of a carbon fiber cloth layer 91 wrapping a surface of the upper shell 1 and the lower shell 2, a metal belt 93, a down conductor 96 that is connected with a wind turbine lightning protection system, a doubling device 95 and a wire doubling device 94. The carbon fiber cloth layer 91 conducts a lightning current to the metal belt 93. The metal belt 93 is connected with the down conductor 96 through a wire.

Figure 8:
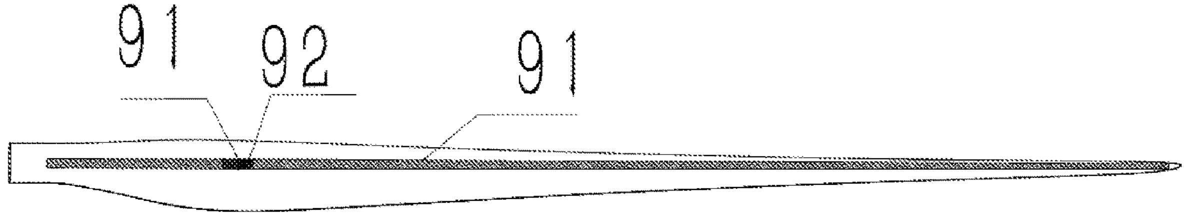
FIG. 8 is a lateral external view of a wind turbine blade of Embodiment 1.

As shown in FIG. 8, in a wind turbine blade, the upper shell 1 and the lower shell 2 are provided with the wind turbine blade lightning protection system of this embodiment. The carbon fiber cloth layer 91 covers outer surfaces of the upper shell 1 and the lower shell 2, and is laid from a blade tip to a blade root. A width of the carbon fiber cloth layer 91 depends on a lightning current carrying capacity of a carbon fiber material, and a minimum requirement is that the lightning current passes through the carbon fiber cloth layer 91 without damaging the carbon fiber cloth layer. The carbon fiber cloth layer 91 plays a dual role of structural bearing and lightning current conduction in the wind turbine blade of this embodiment.

Figure 10:
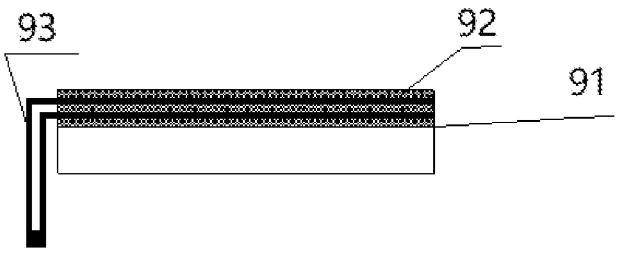
FIG. 10 is a diagram of a connection section of a carbon fiber cloth layer and a metal belt in Embodiment 1.

As shown in FIG. 8, the carbon fiber cloth layer 91 and the metal belt 93 are connected with the blade by integral infusion. A connection point of the metal belt and the carbon fiber cloth along the length direction of the blade is located in a region that contributes 30% to the total length of the wind turbine blade from the blade root. As shown in FIGS. 7 and 10, in a position near the blade root, the carbon fiber cloth layer 91 conducts the lightning current to two layers of metal belts 93 through two additional carbon fiber cloth layers 92. The carbon fiber cloth layer 91 is superimposed with an additional carbon fiber cloth layer 92. Each carbon fiber cloth layer 92 is alternately superimposed with each layer of metal belt 93, with the same superimposed area at each layer. The carbon fiber cloth layer 91 and the additional carbon fiber cloth layer 92 completely cover the metal belt 93. The ability of the superimposed carbon fiber cloth layers to pass current reaches a lightning current standard of 200 KA. The lightning is dispersed to the multiple layers of metal belts 93 through the multiple additional carbon fiber cloth layer 92 and is finally conducted to the down conductor 96. The multilayer alternate superimposed design of the additional carbon fiber cloth layers 92 and metal belts 93 reduces the sudden change of resistance from the carbon fiber cloth layers 91 to the metal belts 93. When the lightning current is conducted from the carbon fiber cloth layer 91 to the down conductor 96, this design reduces the damage of the lightning current to the carbon fiber near the carbon fiber cloth layer.

Specifically, the carbon fiber cloth layer 91 is connected to the surface of the blade shell by integral infusion. During the infusion process, the carbon fiber cloth layer 91 is laid on the mold, and the resin is then infused, such that the resin and the inner side of the carbon fiber cloth layer 91 form an integral structure. The outer side of the carbon fiber cloth layer 91 is not wrapped with the resin, and is exposed to conduct lightning.

Figure 9:
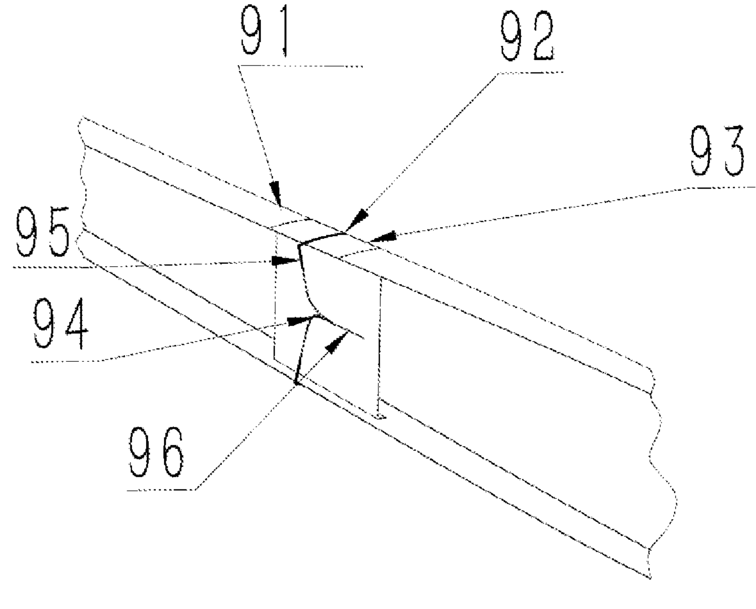
FIG. 9 is a connection diagram of a carbon fiber cloth layer and a down conductor in Embodiment 1.

As shown in FIG. 9, the metal belt 93 passes through the upper shell 1 and the lower shell 2 and extends into the blade chamber to be twisted into a strand, and is connected with the wire through a doubling device 95. Upper and lower wires are connected with the down conductor 96 through a wire doubling device 94. The down conductor 96 is connected with the wind turbine lightning protection system at the blade root.

The carbon fiber cloth layer is laid on the surface of the shell through infusion for air termination. It expands the air termination area, improves the air termination efficiency, and guides the lightning to the down conductor at the blade root.

In this embodiment, a method for manufacturing the lightweight wind turbine blade includes: assemble the upper shell 1, the lower shell 2, the pressure surface lightweight spar cap 3, the suction surface lightweight spar cap 4 and the web 5 as a whole. Specifically:

(1) Respectively fixedly connect a pressure surface lightweight spar cap 3 and a suction surface lightweight spar cap 4, which are respectively provided with a positioning groove, with an upper shell 1 and a lower shell 2 as a whole.

(2) Place the suction surface lightweight spar cap 4 fixedly connected with the lower shell 2 as a whole upwards, and apply a structural glue to the positioning groove 34 of the suction surface lightweight spar cap 4; lift a web 5 onto the suction surface lightweight spar cap 4, and insert a lower base plate 52 of the web 5 into the positioning groove 34 coated with the structural glue to realize the positioning and fixing of the web 5 on the suction surface lightweight spar cap 4.

(3) Apply a structural glue to a lower bonding surface 21 and an outer surface of an upper base plate 51 of the web 5, lift the upper shell 1 together with the pressure surface lightweight spar cap 3 fixed with the upper shell 1 above the web 5, lower the upper shell 1 and the pressure surface lightweight spar cap 3, insert the upper base plate 51 of the web 5 into the positioning groove 34 of the pressure surface lightweight spar cap 3, and bind an upper bonding surface 11 of the upper shell 1 with the lower bonding surface 21 of the lower shell 2 until the structural glue is condensed.

What is claimed is:

1. A lightweight spar cap with a concave structure for a wind turbine blade, wherein the lightweight spar cap is groove-shaped as a whole, and comprises supporting portions (32) located on two wings of the lightweight spar cap and an intermediate connecting portion (36) connecting the two supporting portions (32);

one splicing surface formed by connecting the supporting portion (32) and the intermediate connecting portion (36) is an integral plane; the shape of the integral plane is configured to be consistent with an inner side of an upper shell (1) or a lower shell (2) of the wind turbine blade for abutting;

the other splicing surface formed by connecting the supporting portion (32) and the intermediate connecting portion (36) is a groove-shaped discontinuous plane; a positioning groove (34) formed by the groove-shaped discontinuous plane is configured to be consistent with an end of a web (5) of the wind turbine blade for abutting and nesting; and a cross section of the intermediate connecting portion (36) is in a trapezoidal shape; a reinforcing body of the intermediate connecting portion is formed by sequentially superimposing multiple layers of reinforcing fiber cloths from an upper base to a lower base of a trapezoid; a cross section of the reinforcing body formed by superimposing the reinforcing fiber cloths presents a trapezoidal shape, wherein the positioning groove is formed by the supporting portions and the intermediate connecting portion of the lightweight spar cap, and wherein a thickness of the supporting portion (32) is greater than that of the intermediate connecting portion (36), and each of the supporting portions wraps a lateral side and a part of a side of the intermediate connecting portion (36) into the positioning groove that is inverted trapezoidal, the side is located at the other splicing surface formed by connecting the supporting portion (32) and the intermediate connecting portion (36).

2. The lightweight spar cap with a concave structure for a wind turbine blade according to claim 1, wherein the reinforcing fiber cloths are carbon fiber cloths, and the reinforcing body is formed by laying the carbon fiber cloths with equal widths in staggered layers so as to present the trapezoidal cross section.

3. The lightweight spar cap with a concave structure for a wind turbine blade according to claim 1, wherein an inclined surface (37) is provided at an outer corner of the supporting portion (32) and is kept parallel to a trapezoidal lateral side of the intermediate connecting portion (36).

4. The lightweight spar cap with a concave structure for a wind turbine blade according to claim 1, wherein the supporting portion (32) adopts a reinforcing material composed of one or more from the group consisting of balsa, polyvinyl chloride (PVC), polyethylene terephthalate (PET) and high-density polyethylene (HPE); the supporting portion (32) and the intermediate connecting portion (36) are integrally molded by resin infusion.

5. A lightweight wind turbine blade, comprising an upper shell (1), a lower shell (2), a web (5) and two lightweight spar caps for the wind turbine blade, wherein the lightweight spar caps for the wind turbine blade are concave spar caps, and the two concave spar caps comprise a pressure surface lightweight spar cap (3) and a suction surface lightweight spar cap (4):

a longitudinal positioning structure is provided on one side of each of the pressure surface lightweight spar cap (3) and the suction surface lightweight spar cap (4); double ends of the web (5) are respectively connected with the positioning structures of the pressure surface lightweight spar cap (3) and the suction surface lightweight spar cap (4) through a positioning matching structure, and are fixedly connected with the pressure surface lightweight spar cap (3) and the suction surface lightweight spar cap (4) as a whole, to form a lightweight spar cap structure combination; and one end of the lightweight spar cap structure combination for the wind turbine blade is connected with the upper shell (1), and the other end thereof is connected with the lower shell (2); the lightweight spar cap structure combination for the wind turbine blade is fixedly connected with the upper shell (1) and the lower shell (2) as a whole; double ends of the upper shell (1) and the lower shell (2) are correspondingly connected to form a leading edge (6) and a trailing edge (7) respectively;

the lightweight spar cap is groove-shaped as a whole, and comprises supporting portions (32) located on two wings of the lightweight spar cap and an intermediate connecting portion (36) connecting the two supporting portions (32);

one splicing surface formed by connecting the supporting portion (32) and the intermediate connecting portion (36) is an integral plane; the shape of the integral plane is configured to be consistent with an inner side of an upper shell (1) or a lower shell (2) of the wind turbine blade for abutting;

the other splicing surface formed by connecting the supporting portion (32) and the intermediate connecting portion (36) is a groove-shaped discontinuous plane; a positioning groove (34) formed by the groove-shaped discontinuous plane is configured to be consistent with an end of a web (5) of the wind turbine blade for abutting and nesting; and a cross section of the intermediate connecting portion (36) is in a trapezoidal shape; a reinforcing body of the intermediate connecting portion is formed by sequentially superimposing multiple layers of reinforcing fiber cloths from an upper base to a lower base of a trapezoid; a cross section of the reinforcing body formed by superimposing the reinforcing fiber cloths presents a trapezoidal shape, wherein the positioning groove is formed by the supporting portions and the intermediate connecting portion of the lightweight spar cap, and wherein a thickness of the supporting portion (32) is greater than that of the intermediate connecting portion (36), and each of the supporting portions wraps a lateral side and a part of a side of the intermediate connecting portion (36) into the positioning groove (34) that is inverted trapezoidal, the side is located at the other splicing surface formed by connecting the supporting portion (32) and the intermediate connecting portion (36).

6. The lightweight wind turbine blade according to claim 5, wherein a trailing edge web (8) is provided in a trailing edge chamber defined by the web (5) and the trailing edge (7).

7. The lightweight wind turbine blade according to claim 6, wherein a starting point (61) of the trailing edge web (8) along a length direction of the blade is provided in a region that is spaced apart from a blade root (63) by 12% to 15% of a length of the blade, and an end point (62) of the trailing edge web (8) along the length direction of the blade is provided in a region that is spaced apart from the blade root (63) by 57% to 60% of the length of the blade from the blade root (63); a height of the trailing edge web (8) is smaller than that of the web (5), and the trailing edge web is parallel to the web (5).

8. The lightweight wind turbine blade according to claim 5, wherein the upper shell (1) and the lower shell (2) are made of a compressive and shear resistant composite material; the composite material comprises a core material and glass fiber fabrics (86) adhered on upper and lower surfaces of the core material; the core material uses a sandwich panel (9) as a support; a path is formed in the sandwich panel (9) to place a fiber bundle; a vertical fiber column (81), a diagonal fiber column (82), a longitudinal fiber rib (83) and a transverse fiber rib (84) are formed in the sandwich panel (9) by a dipping process; the diagonal fiber column (82), the longitudinal fiber rib (83) and the transverse fiber rib (84) form a lattice type fence (85) that is vertically and horizontally interwoven and integrally bonded in the sandwich panel (9); the glass fiber fabrics (86) adhered on the upper and lower surfaces of the sandwich panel (9) are bonded with the vertical fiber column (81) and the lattice type fence (85) to form an integral structure.

9. The lightweight wind turbine blade according to claim 8, wherein the sandwich panel (9) is made of any one or more from the group consisting of balsa, PVC, PET and HPE; the glass fiber fabric (86) is made of a carbon fiber-glass fiber composite material, and the carbon fiber-glass fiber composite material comprises a carbon fiber and a glass fiber in a mass ratio of (10-90):(10-90).

10. The lightweight wind turbine blade according to claim 5, wherein the lightweight wind turbine blade further comprises a lightning protection system; the lightning protection system comprises a carbon fiber cloth layer (91) wrapping a surface of the upper shell (1) and/or the lower shell (2), at least one layer of metal belt (93) and a down conductor (96) that is connected with a wind turbine lightning protection system; the carbon fiber cloth layer (91) conducts a lightning current to the metal belt (93); the metal belt (93) is connected with the down conductor (96) through a wire.

11. The lightweight wind turbine blade according to claim 10, wherein the carbon fiber cloth layer (91) conducts the lightning current to the at least one layer of metal belt (93) through at least one additional carbon fiber cloth layer (92); a width of the carbon fiber cloth layer (91) depends on a lightning current carrying capacity of a carbon fiber material, and a minimum requirement is that the lightning current passes through the carbon fiber cloth layer (91) without damaging the carbon fiber cloth layer (91).

12. The lightweight wind turbine blade according to claim 11, wherein there are multiple additional carbon fiber cloth layers (92) and multiple layers of metal belts (93); the multiple additional carbon fiber cloth layers (92) and the multiple layers of metal belts (93) are alternately arranged, such that the lightning is dispersed to the multiple layers of metal belts (93) through the multiple additional carbon fiber cloth layers (92) and is finally conducted to the down conductor (96); a superimposed area of each additional carbon fiber cloth layer (92) is the same, and each additional carbon fiber cloth layer (92) completely wraps the metal belt (93).

13. The lightweight wind turbine blade according to claim 10, wherein the carbon fiber cloth layer (91) is laid from a blade tip to the blade root (63); a connection point of the metal belt (93) and the carbon fiber cloth layer (91) along the length direction of the blade is located in a region that is spaced apart from the blade root (63) by 30% of the length of the wind turbine blade, and is connected with the blade by integral infusion.

14. The lightweight wind turbine blade according to claim 10, wherein the metal belt (93) passes through the blade shell and extends into the blade chamber to be twisted into a strand, and is connected with the wire through a doubling device (95); upper and lower wires are connected with the down conductor (96) through a wire doubling device (94); the down conductor (96) is connected with the wind turbine lightning protection system at the blade root (63).

15. A lightweight spar cap structure combination for the lightweight wind turbine blade according to claim 5, wherein the positioning structure and the positioning matching structure adopt a groove matching positioning mode; one of the positioning structure and the positioning matching structure is configured as a positioning groove (34), and the other thereof is configured as an insert that fits with the positioning groove (34); and the groove matching positioning mode is as follows:

the positioning groove (34) is a trapezoidal groove respectively provided on the pressure surface lightweight spar cap (3) and the suction surface lightweight spar cap (4), and the insert is an upper base plate (51) and a lower base plate (52) which are respectively provided at double ends of the web (5) and matched with the trapezoidal groove;

the lightweight spar cap is groove-shaped as a whole, and comprises supporting portions (32) located on two wings of the lightweight spar cap and an intermediate connecting portion (36) connecting the two supporting portions (32);

one splicing surface formed by connecting the supporting portion (32) and the intermediate connecting portion (36) is an integral plane; the shape of the integral plane is configured to be consistent with an inner side of an upper shell (1) or a lower shell (2) of the wind turbine blade for abutting;

the other splicing surface formed by connecting the supporting portion (32) and the intermediate connecting portion (36) is a groove-shaped discontinuous plane; a positioning groove (34) formed by the groove-shaped discontinuous plane is configured to be consistent with an end of a web (5) of the wind turbine blade for abutting and nesting; and a cross section of the intermediate connecting portion (36) is in a trapezoidal shape; a reinforcing body of the intermediate connecting portion is formed by sequentially superimposing multiple layers of reinforcing fiber cloths from an upper base to a lower base of a trapezoid; a cross section of the reinforcing body formed by superimposing the reinforcing fiber cloths presents a trapezoidal shape.

* * * * *